US 12,499,336 B2

(12) United States Patent
Deoda et al.

(10) Patent No.: US 12,499,336 B2
(45) Date of Patent: Dec. 16, 2025

(54) AR VIEW FOR BARCODE SCANNING

(71) Applicant: Samsung Electronics Co., Ltd., Suwon-si (KR)

(72) Inventors: Vikrant Deoda, Santa Clara, CA (US); Eunhye Kim, Beverly Hills, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/435,269

(22) Filed: Feb. 7, 2024

(65) Prior Publication Data

US 2025/0148235 A1  May 8, 2025

Related U.S. Application Data

(60) Provisional application No. 63/596,567, filed on Nov. 6, 2023.

(51) Int. Cl.
*G06K 7/10* (2006.01)
*G06K 7/14* (2006.01)
*G06Q 10/087* (2023.01)

(52) U.S. Cl.
CPC ....... *G06K 7/10722* (2013.01); *G06K 7/1413* (2013.01); *G06Q 10/087* (2013.01)

(58) Field of Classification Search
USPC .................. 235/462.01–462.49, 385; 705/28
See application file for complete search history.

(56) References Cited

U.S. PATENT DOCUMENTS

| 10,910,096 B1 | 2/2021 | Brown |
| 10,963,658 B1 | 3/2021 | Bloch |
| 11,455,869 B2 | 9/2022 | Bronicki |
| 11,532,149 B1 | 12/2022 | Floerkemeier |
| 2019/0012756 A1* | 1/2019 | Han ..................... G06Q 10/08 |
| 2022/0383401 A1 | 12/2022 | Bronicki |

(Continued)

FOREIGN PATENT DOCUMENTS

| CN | 116301459 A | 6/2023 |
| TW | 201118745 A | 6/2011 |

(Continued)

OTHER PUBLICATIONS

Machine translation of WO 2024048129, retrieved Dec. 13, 2024 (Year: 2024).*

(Continued)

*Primary Examiner* — Suezu Ellis (57) ABSTRACT

In one embodiment, a method includes accessing, by a mobile device, information identifying a number of barcodes and initiating a scanning session for the number of barcodes, the scanning session including capturing a number of images by a camera of the mobile device. The method further includes displaying, on a display of the mobile device and during the scanning session, a user interface that includes: (1) a current image captured by the camera of the mobile device; (2) for one or more barcodes in the current image, an augmented-reality overlay including information associated with that respective barcode; and (3) a scanning-session tracking element identifying one or more of the number of barcodes that have been scanned during the scanning session.

20 Claims, 5 Drawing Sheets

(56) References Cited

U.S. PATENT DOCUMENTS

2025/0180369 A1* 6/2025 Gurgul .............. G06Q 10/0838

FOREIGN PATENT DOCUMENTS

WO     WO-2022074955 A1 * 4/2022 ............. G06K 17/00
WO     WO-2024048129 A1 * 3/2024

OTHER PUBLICATIONS

Machine translation of WO 2022/074955, retrieved Aug. 8, 2025 (Year: 2025).*
Scandit MatrixScan AR Scanner Apps video, available at https://www.scandit.com/products/augmented-reality/, at 00:45, 00:55, Accessed on Mar. 13, 2024.
Scandit Sorting & Loading video, available at https://www.scandit.com/products/augmented-reality/, at 00:05, Accessed on Mar. 13, 2024.
Scandit MatrixScan Find video, available at https://www.scandit.com/products/matrixscan-find/#!, at 00:30, Accessed on Mar. 13, 2024.

* cited by examiner

AR VIEW FOR BARCODE SCANNING

PRIORITY CLAIM

This application claims the benefit under 35 U.S.C. § 119 of U.S. Provisional Patent Application No. 63/596,567 filed Nov. 6, 2023, which is incorporated by reference herein.

TECHNICAL FIELD

This application generally relates to an augmented reality (AR) view for barcode scanning.

BACKGROUND

A barcode represents data in a visual, machine-readable form. For example, barcodes can represent data by varying the widths, spacings and sizes of parallel lines, or by parameters of other geometric shapes within the barcode. Barcodes can be scanned by barcode readers, such as optical scanners, which capture an image of the barcode and translate the information encoded by the barcode.

A wedge scanner is a physical device that attaches between a keyboard and a computer. The keyboard attaches to the scanner, and the scanner attaches to the computer. From the computer's perspective, the scanner behaves just like an additional keyboard. When the computer runs a software program, such as a spreadsheet application, barcodes can be read using the wedge scanner, and data is sent from the scanner to the program in the form of keystrokes. From the program's point of view, data appears exactly as if someone had typed it manually using a keyboard.

A wedge software scanner also operates as if between a software program and keyboard. However, instead of being a physical scanning device, a wedge software scanner is software that may be deployed on computing devices, such as end-user client devices (e.g., smartphone, personal computers, wearable devices, tablets, etc.). Once a wedge software scanner is installed and running on a device, it wedges between an application (for example, an application used to track inventory) and the mobile device's on-screen keyboard. When an end-user launches the application, they can simply tap an on-screen button or press a hardware button on their device to trigger a barcode scan using the device's camera. After the camera focuses on a barcode, the wedge software scanner can translate the barcode data into keystrokes, which then get passed back to the application for processing. From the application's point of view, keystrokes coming from software wedge scanner appear as if a user had typed them from the device keyboard.

DESCRIPTION OF EXAMPLE EMBODIMENTS

Searching for multiple barcodes is typically a tedious and time-consuming process that requires a user to scan candidate barcodes one at a time and compare the scanned information with the barcodes being searched for. For example, a worker seeking to fulfill a product order for multiple items may need to point a device's camera (e.g., a smartphone camera) at an individual candidate box in a warehouse, invoke the device's barcode scanner, determine whether the scanned barcode matches an item in the order, and repeat this process until all items in the order have been found. In contrast, the processes and systems described herein allow a user to find and scan all barcodes associated with the order in a single scanning session, among other things.

Figure 1:
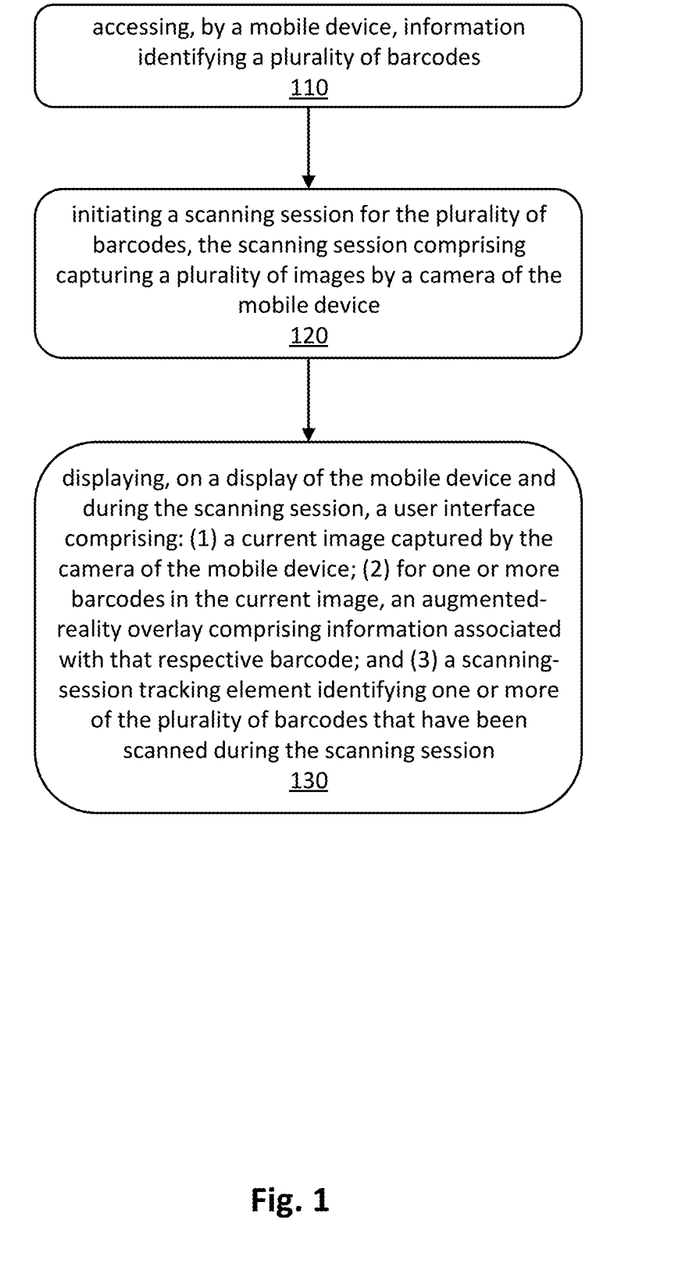
FIG. 1 illustrates an example method for providing an AR view during a barcode scanning session.

FIG. 1 illustrates an example method for providing an AR view during a barcode scan. Step 110 of the example method of FIG. 1 includes accessing, by a mobile device, information identifying a plurality of barcodes. In particular embodiments, the information identifying a plurality of barcodes may result from the user scanning each barcode that the user wants to search for during a scanning session. For example, if a user is searching for five items with five corresponding barcodes, then the user may scan each of the barcodes. Therefore, each scanned barcode identifies one of the plurality of barcodes described in step 110 of the example method of FIG. 1. In particular embodiments, information identifying a plurality of barcodes may be entry of any suitable information, such as a barcode identifier or other unique information identifying a barcode. In particular embodiments, a barcode may identify all the barcodes to use during a scanning phase. For example, a user may place a grocery order for 25 items, each of which is associated with a particular barcode. The grocery merchant may associate these 25 barcodes with a single barcode specific to the user's order, and upon scanning the order-specific barcode, the 25 item barcodes may be automatically identified for a subsequent scanning session.

Figure 2:
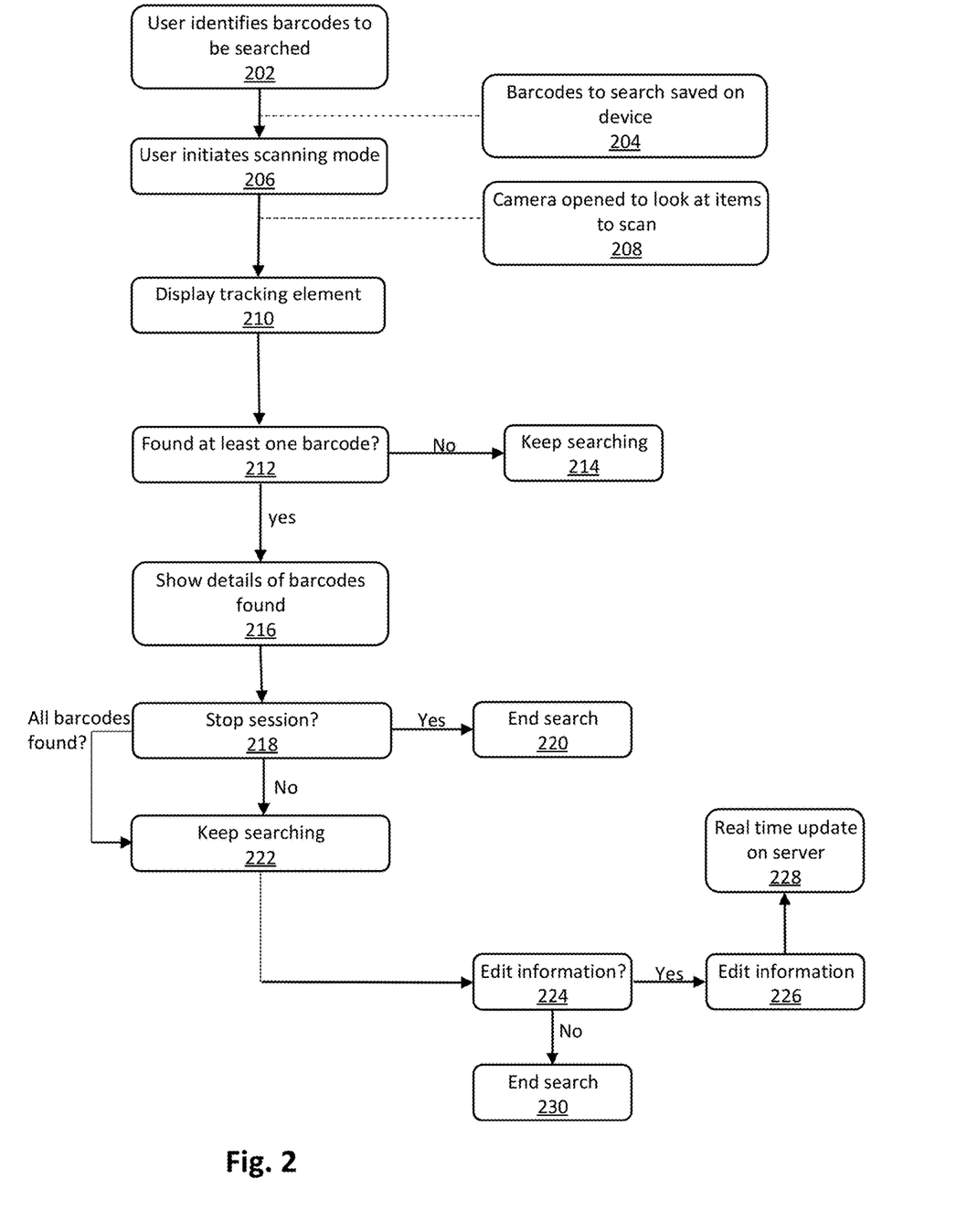
FIG. 2 illustrates an example process implementing the example method of FIG. 1.
Figure 3A:
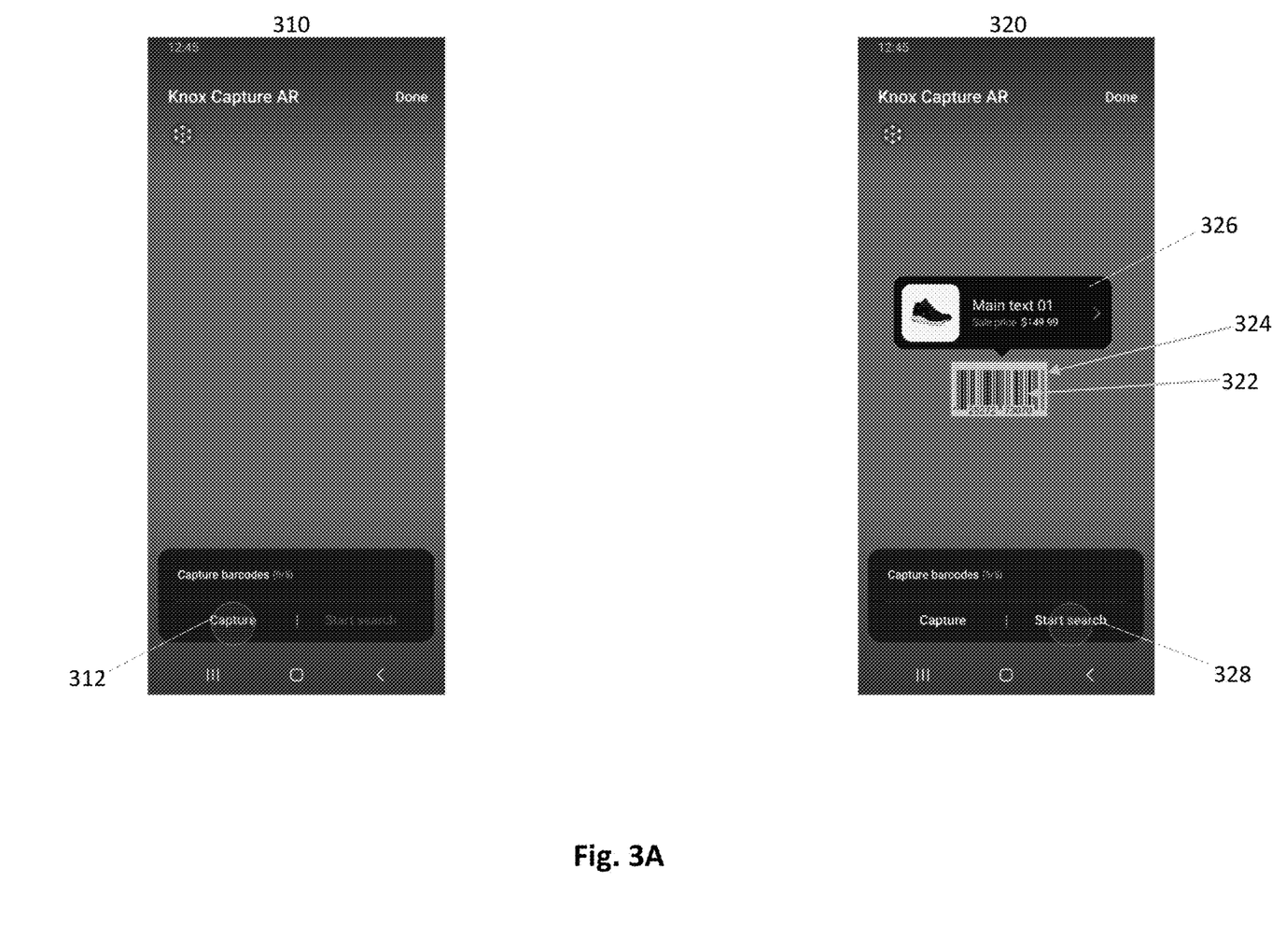
FIGS. 3A-3B illustrate an example user interface displayed on a mobile device in connection with a barcode scanning session.
Figure 3B:
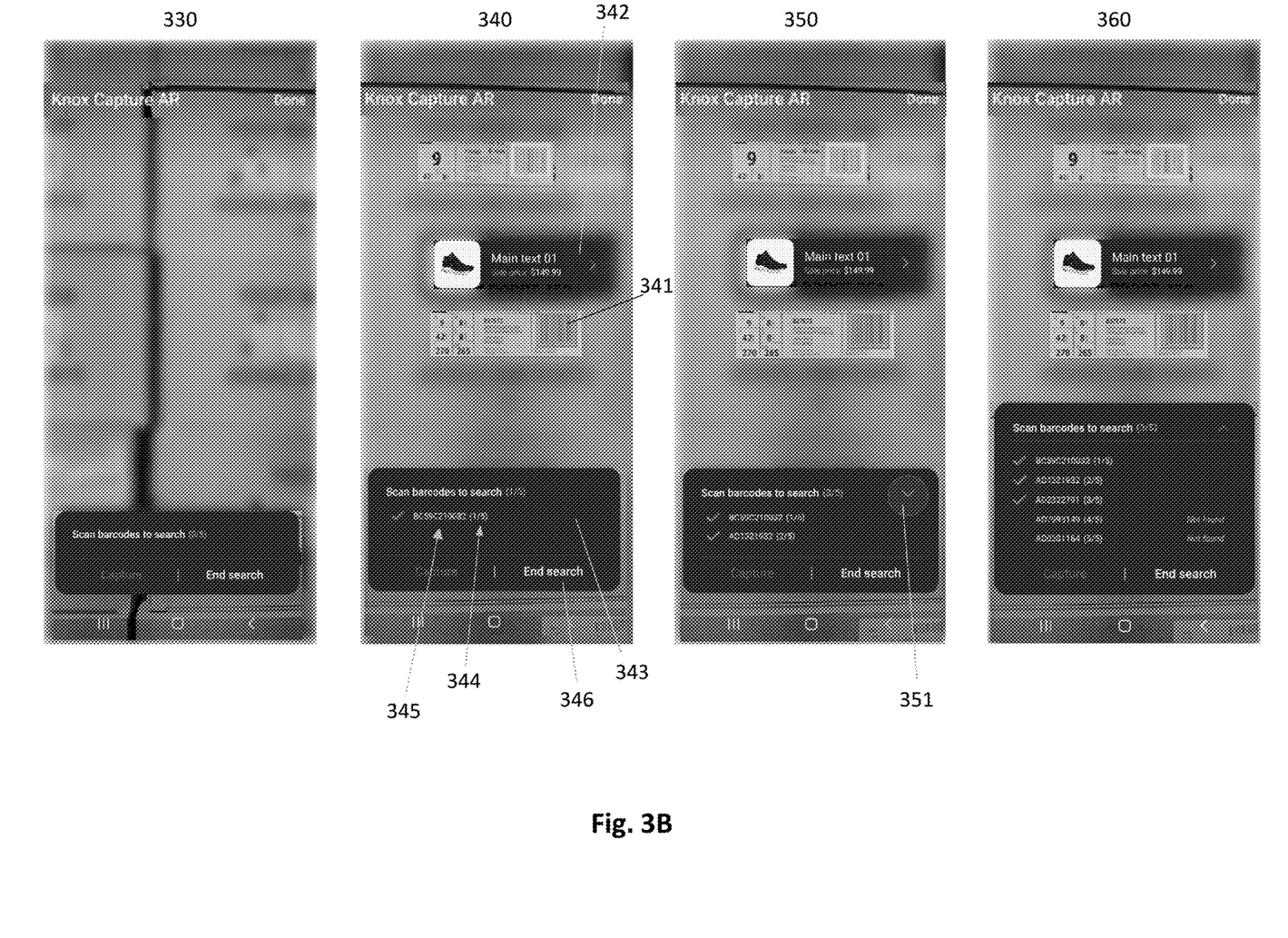

FIG. 2 illustrates an example process implementing the example method of FIG. 1. At step 202 in the example of FIG. 2, a user identifies the barcodes to be searched. FIGS. 3A-3B illustrate an example user interface displayed on a mobile device in connection with an example barcode scanning session. FIG. 3A illustrates example user interfaces (UIs) of a capture phase, in which a user identifies barcodes to find during a scanning process. FIG. 3B illustrates example UIs of the scanning/search process for the barcodes identified during the capture phase.

In the example of FIG. 3A, image 310 illustrates a user interface for initiating the identification of one or more barcodes. For example, a user may interact with UI element 312 to start capturing barcodes with the user's mobile device, which may be a smartphone, a tablet, a wearable, a laptop, a scanner, etc. After interacting with element 312, the user may then scan one or more barcodes to search for during the scanning/search session. Image 320 in FIG. 3A illustrates an example UI showing a user scanning a barcode 322 to add to the list of barcodes to search for. As illustrated in image 320 and as described more fully below, particular embodiments may provide one or more augmented reality (AR) overlays when scanning a barcode. Image 320 illustrates that barcode 322 is overlaid with an outline 324, and upon scanning barcode 322, an informational AR overlay 326 is displayed on the UI. As described more fully below, an informational AR overlay may provide information associated with an item corresponding to a barcode.

In particular embodiments, as illustrated in step 204 of the example process of FIG. 2, the barcodes identified during the capture phase may be saved locally on the mobile device, so that the device can perform the scanning/search phase even when offline. When a user has completed identifying all the barcodes the user wishes to search for during the scanning phase, then at step 206 of FIG. 2 the user initiates the scanning/search phase. For example, as illustrated in image 320 of FIG. 3A, a user may interact with element 328 to initiate the scanning session.

Step 120 of the example method of FIG. 1 includes initiating a scanning session for the plurality of barcodes, the scanning session comprising capturing a plurality of images by a camera of the mobile device. In other words, during the scanning session, a camera of the mobile device captures images of the environment in the camera's field of view. The images are displayed in real time on the display of the mobile device, so that as the user moves the camera during the search phase, the current image captured by the camera is shown on the mobile device's display. Image 330 in FIG. 3B illustrates an example UI showing an image captured by the camera and showing a scanning-session tracking element, which described more fully below.

Step 130 of the example method of FIG. 1 includes displaying, on the display of the mobile device and during the scanning session, a user interface that includes: (1) a current image captured by the camera of the mobile device; (2) for one or more barcodes in the current image, an augmented-reality overlay comprising information associated with that respective barcode; and (3) a scanning-session tracking element identifying one or more of the plurality of barcodes (identified during the capture phase) that have been scanned during the scanning session.

Image 340 of FIG. 3B illustrates an example embodiment of a user interface of step 130 of the method of FIG. 1. In image 340, barcode 341 in the image has a corresponding augmented reality overlay 342, which provides information about an item associated with barcode 341. In particular embodiments, a user (such as an administrator) may set up one or more AR templates that define the information to be shown in a particular AR overlay. For instance, in example image 340, the template may identify an image of the product and a sale price of the product, and this information is then shown in AR overlay 342 when barcode 341 is scanned.

Image 340 also illustrates an example embodiment of scanning-session tracking element 343 referenced in step 130 of the example method of FIG. 1. In the example of image 340, scanning-session tracking element 343 includes an identification 344 of the number of barcodes found (here, "1") out of the overall number of barcodes identified during the capture phase (here, "5"). Scanning session tracking element 343 also includes an identification 345 of the barcode(s) identified during the capture phase that have been found during the scanning phase. Step 210 of the example process of FIG. 2 illustrates that, upon entering the scanning mode, the UI displaying the scanning session tracking element identifies which barcodes have been found. During the scanning phase, the process determines 212 whether at least one of the identified barcodes has been found. If not, then at step 214 the process continues scanning barcodes in images captured by the camera and continues searching for the barcodes identified during the capture phase. If yes, then at step 216 the UI displays the details of the barcodes found, such as is illustrated in the example identification 345 of example scanning-session tracking element 343 shown in image 340.

If all of the barcodes identified during the capture phase have been found at decision block 218, then the process may end the scanning phase at step 220. As illustrated in the example image 340, a user may also manually end the scanning phase, for example by interacting with element 346 of element 343. If not all barcodes have been found in decision block 218 and the user has not manually ended the search, then the scanning phase continues in step 222, and loops to decision block 218 until the session ends.

In particular embodiments, element 343 includes an interactive element, such as chevron 351 shown in example image 350, for providing additional information about barcodes to search for during a scanning phase. For example, as illustrated in image 360, when a user interacts with chevron 351, then element 343 may be expanded to reveal additional information about the barcodes being searched for. In the example of image 360, expanded element 343 identifies each of the 5 barcodes being searched for during the search phase, and also indicates whether each of the barcodes has been found or not found so far (in the example of image 360, a checkmark indicates that the barcode is found, while a textual description is provided for a barcode that has not been found). In particular embodiments, when more barcodes are identified during a capture phase than can be shown on a scanning session tracking element, then a user may, for example, scroll through the listing of barcodes to view all of the barcodes. In particular embodiments, a user may order the listing of barcodes in a scanning session tracking element (for example, order the listing by not found to found, order the barcodes alphanumerically, etc.).

In particular embodiments, a user may update information associated with a barcode detected in an image. For example, a user may interact with augmented reality overlay 342 in image 340 to reveal a UI that allows the user to update information associated with barcode 341 and/or associated with the item identified by barcode 341. In particular embodiments, the information that a user can update may be identified in one or more templates predetermined by a user (e.g., an administrator). The templates may be specific to particular application(s), user(s), device(s), barcode(s), and/or item(s). As an example of the type of information a user may update, a user may update a sale price for an item associated with a barcode. In particular embodiments, this update is propagated through the system associated with the barcode scanner. For example, in particular embodiments, an entity (e.g., a particular business) may host a database that identifies barcodes, items, and associated information. When a user updates the information associated with a barcode during a scanning session (e.g., updates a sale price for an item identified by the barcode), then that update may be made to the database, so that when a different user scans the same barcode (which may be on a different instance of the item associated with the barcode) the updated information is displayed to the other user. For instance, the example process of FIG. 2 illustrates an example in which a user can choose to edit information in step 224. If the user has not chosen to edit information during a scanning session, then the session may end 230. If the user has chosen to edit information in step 224, then the user can edit the information in step 226 (for example, as described above) and the edit will be propagated in real time to a server device in step 228, so that subsequent barcode scans by other users or by the same user do not show outdated information.

In particular embodiments, information displayed in association with a barcode (e.g., information displayed by an augmented reality overlay for a barcode or on a subsequent UI reached by interacting with the overlay) may be information that is directly encoded by a barcode (e.g., an item identification). In particular embodiments, such information displayed may be additional information that is not directly encoded by the barcode (e.g., a particular merchant's sales price for a particular item), but may be associated with the barcode, e.g., in a merchant database. For example, an employee of a shipping merchant may scan a package barcode upon delivering the package, and update information associated with that barcode by, e.g., appending a note and/or a picture showing proof of delivery.

As described above, in particular embodiments a user can search for barcodes (using a mobile device's camera), view information about an item associated with a particular barcode, update information, and track the progress of a scanning session (e.g., via element 343) all during a single scanning session. In other words, the session continues searching for barcodes and updating the corresponding UIs throughout a scanning session based on the current image captured by the camera. For example, the user can view the specific barcodes that are found or not found during a scanning session, without pausing the scanning session. The user does not need to pause the scanning session in order to view item information or scanning progress, and instead can perform those tasks while continuing the scanning session. The session may stop only when specifically paused by a user (e.g., based on a manual pause input or based on a request to update information, etc.) and may continue until the session is terminated (e.g., manually or because all barcodes identified during the capture phase have been found during the scanning phase).

In particular embodiments, the processes described above may be provided by an application without the need for software-development kit integration or other coding by the end user. For example, an application providing the processes described herein may have privileged access to system resources, such as hardware, applications, or system processes, and so can provide out-of-the-box functionality without requiring end-user code to integrate barcode-scanning processes with other applications or system functions on the mobile device. For instance, particular embodiments may provide a dedicated icon for launching a scanning process as described herein from any system keyboard displayed on the mobile device, regardless of the context or application such keyboard is displayed in.

This disclosure contemplates that the systems and methods described herein may be used for any suitable process involving scanning barcodes. For example, a retail worker may use the processes described herein to help pick up and deliver an online order to a customer. As another example, a retail worker may use the processes described herein to find and pick up multiple products at the same time to fulfill an online order and package it for home delivery. As another example, a retail worker may use the processes described herein to perform inventory management by scanning items and updating information in real time. As another example, a retail worker can perform price checks or other informational checks on items and update that information immediately, if needed.

As another example, a delivery driver may use the processes described herein to find a box or multiple boxes to deliver to a particular customer from a set of boxes, as having to do this search process box-by-box can be very time consuming. As another example, a picker/lift operator can scan from dozens of products, find the ones needed, and move them to a different location as needed.

The processes and systems described herein are not limited to the retail environment. For example, in a healthcare setting, a lab technician can quickly find a particular patient's samples from all available samples using the processes described herein. As another example, a healthcare professional can scan patient documentation barcodes to find a specific one. As another example, a healthcare professional can update patient notes, dosage, and medicine information using the processes described herein. As another example, a user can scan a piece of medical equipment to determine where (e.g., which room or patient) the medical equipment needs to go, and can review or append notes in association with a barcode on the equipment.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1. Moreover, this disclosure contemplates that some or all of the computing operations described herein, including certain steps of the example method illustrated in FIG. 1, may be performed by circuitry of a computing device described herein, by a processor coupled to non-transitory computer readable storage media, or any suitable combination thereof.

Figure 4:
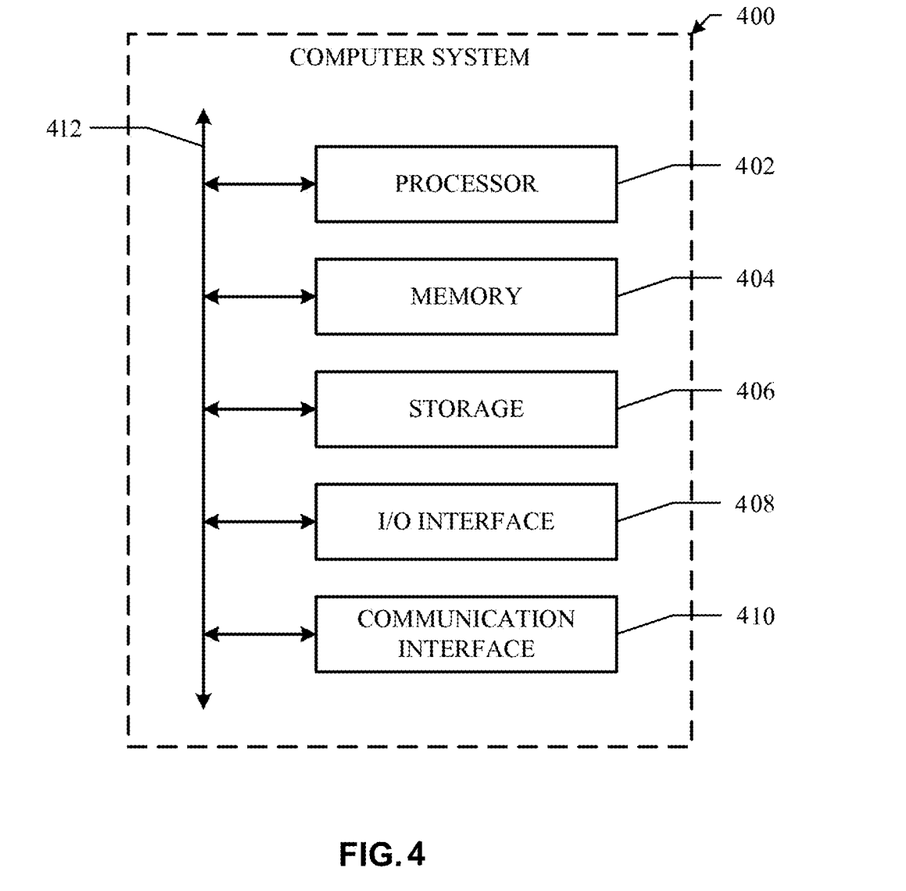
FIG. 4 illustrates an example computing system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
    accessing, by a mobile device, information identifying a plurality of particular barcodes to search for in a physical environment during a scanning session;
    initiating the scanning session for the plurality of particular barcodes to search for, the scanning session comprising capturing a plurality of images by a camera of the mobile device;
    scanning, during the scanning session and in the plurality of captured images, one or more of the plurality of particular barcodes to search for;
    displaying, on a display of the mobile device and during the scanning session, a user interface comprising:
        a current image captured by the camera of the mobile device;
        for one or more barcodes in the current image, an augmented-reality (AR) overlay comprising information associated with that respective barcode; and
        a scanning-session tracking element, distinct from the AR overlay, displaying information identifying the one or more of the plurality of particular barcodes to search for that have been scanned during the scanning session.

2. The method of claim 1, wherein accessing the information identifying the plurality of particular barcodes comprises scanning, by the mobile device and prior to initiating the scanning session, each of the plurality of particular barcodes.

3. The method of claim 1, wherein the augmented-reality overlay comprises a graphical emphasis at the location of the respective barcode in the image.

4. The method of claim 1, wherein the augmented-reality overlay comprises an identification of whether the respective barcode is one of the plurality of particular barcodes.

5. The method of claim 1, wherein the augmented-reality overlay comprises information associated with an item identified by the respective barcode.

6. The method of claim 5, wherein the information associated with the item identified by the respective barcode is encoded by the respective barcode.

7. The method of claim 1, wherein the scanning-session tracking element identifies each of the plurality of particular barcodes to search for that have been scanned during the scanning session.

8. The method of claim 1, wherein the scanning-session tracking element further identifies one or more of the plurality of particular barcodes to search for that have not been scanned during the scanning session.

9. The method of claim 1, wherein the augmented-reality overlay further comprises an interactive element, the method further comprising:
    receiving a user interaction with the interactive element; and in response to the user interaction, providing a second user interface for updating information associated with an item corresponding to the respective barcode.

10. The method of claim 9, further comprising:
receiving, at the second user interface for updating information associated with an item corresponding to the respective barcode, user input updating at least some of the information associated with the item corresponding to the respective barcode; and
transmitting, by the mobile device, the updated information to a computing device storing a database associating the respective barcode with item information.

11. One or more non-transitory computer readable storage media storing instructions and coupled to one or more processors that are operable to execute the instructions to:
access, by a mobile device, information identifying a plurality of particular barcodes to search for in a physical environment during a scanning session;
initiate the scanning session for the plurality of particular barcodes to search for, the scanning session comprising capturing a plurality of images by a camera of the mobile device;
scan, during the scanning session and in the plurality of captured images, one or more of the plurality of particular barcodes to search for;
display, on a display of the mobile device and during the scanning session, a user interface comprising:
a current image captured by the camera of the mobile device;
for one or more barcodes in the current image, an augmented-reality (AR) overlay comprising information associated with that respective barcode; and
a scanning-session tracking element, distinct from the AR overlay, displaying information identifying the one or more of the plurality of particular barcodes to search for that have been scanned during the scanning session.

12. The one or more non-transitory computer readable storage media of claim 11, wherein accessing the information identifying the plurality of particular barcodes comprises scanning, by the mobile device and prior to initiating the scanning session, each of the plurality of particular barcodes.

13. The one or more non-transitory computer readable storage media of claim 11, wherein the augmented-reality overlay comprises an identification of whether the respective barcode is one of the plurality of particular barcodes.

14. The one or more non-transitory computer readable storage media of claim 11, wherein the scanning-session tracking element identifies each of the plurality of particular barcodes to search for that have been scanned during the scanning session.

15. The one or more non-transitory computer readable storage media of claim 11, wherein the scanning-session tracking element further identifies one or more of the plurality of particular barcodes to search for that have not been scanned during the scanning session.

16. An apparatus comprising: one or more non-transitory computer readable storage media storing instructions; and one or more processors coupled to the non-transitory computer readable storage media, the one or more processors operable to execute the instructions to:
access, by a mobile device, information identifying a plurality of particular barcodes to search for in a physical environment during a scanning session;
initiate the scanning session for the plurality of particular barcodes to search for, the scanning session comprising capturing a plurality of images by a camera of the mobile device;
scan, during the scanning session and in the plurality of captured images, one or more of the plurality of particular barcodes to search for;
display, on a display of the mobile device and during the scanning session, a user interface comprising:
a current image captured by the camera of the mobile device;
for one or more barcodes in the current image, an augmented-reality (AR) overlay comprising information associated with that respective barcode; and
a scanning-session tracking element, distinct from the AR overlay, displaying information identifying the one or more of the plurality of particular barcodes to search for that have been scanned during the scanning session.

17. The apparatus of claim 16, wherein accessing the information identifying the plurality of particular barcodes comprises scanning, by the mobile device and prior to initiating the scanning session, each of the plurality of particular barcodes.

18. The apparatus of claim 16, wherein the augmented-reality overlay comprises an identification of whether the respective barcode is one of the plurality of particular barcodes.

19. The apparatus of claim 16, wherein the scanning-session tracking element identifies each of the plurality of particular barcodes to search for that have been scanned during the scanning session.

20. The apparatus of claim 16, wherein the scanning-session tracking element identifies one or more of the plurality of particular barcodes to search for that have not been scanned during the scanning session.

* * * * *